(12) United States Patent
Padawer et al.

(10) Patent No.: US 7,735,021 B2
(45) Date of Patent: Jun. 8, 2010

(54) SHORTCUT SYSTEM FOR USE IN A MOBILE ELECTRONIC DEVICE AND METHOD THEREOF

(75) Inventors: Andrew D. Padawer, Sammamish, WA (US); Jessie D. Tenenbaum, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 09/862,390

(22) Filed: May 21, 2001

(65) Prior Publication Data

US 2002/0115476 A1    Aug. 22, 2002

Related U.S. Application Data

(60) Provisional application No. 60/269,741, filed on Feb. 16, 2001.

(51) Int. Cl.
    G06F 3/048    (2006.01)
(52) U.S. Cl. .................. 715/810; 715/831; 715/864
(58) Field of Classification Search ............. 345/733, 345/742, 847; 455/563; 715/810, 831
    See application file for complete search history.

(56) References Cited

U.S. PATENT DOCUMENTS

| 5,491,745 | A | * | 2/1996 | Roeder ................. 379/355.09 |
| 5,721,850 | A | * | 2/1998 | Farry et al. ................. 715/700 |
| 5,737,560 | A | * | 4/1998 | Yohanan .................... 345/847 |
| 5,832,074 | A |   | 11/1998 | Chang et al. ................. 379/355 |
| 5,877,765 | A | * | 3/1999 | Dickman et al. ............. 715/738 |
| 6,125,287 | A |   | 9/2000 | Cushman et al. ............. 455/566 |
| 6,181,344 | B1 |   | 1/2001 | Tarpenning et al. ......... 345/358 |
| 6,501,966 | B1 | * | 12/2002 | Bareis et al. ................ 455/563 |
| 6,727,923 | B1 | * | 4/2004 | McInerney ................. 345/847 |
| 6,762,692 | B1 | * | 7/2004 | Mingot et al. .......... 340/825.69 |
| 6,842,612 | B2 | * | 1/2005 | Kalish et al. ............. 455/414.2 |

FOREIGN PATENT DOCUMENTS

| JP | 2003298715 A | * | 10/2003 |
| WO | WO 98/48554 |   | 10/1998 |

OTHER PUBLICATIONS

Microsoft Outlook Screen Dumps, pp. 1-2, 1999.*

(Continued)

*Primary Examiner*—Boris Pesin
(74) *Attorney, Agent, or Firm*—Merchant & Gould; Ryan T. Grace

(57) ABSTRACT

A shortcut system for use in a mobile electronic device having several types of shortcuts allows a user to execute shortcuts of different types using a single mechanism. The shortcut system includes a display, an operating system, a shortcut data store, and one or more applications, including a shortcut application used to create shortcuts and edit shortcut information contained in the shortcut data store. The shortcut data store contains target information associated with applications of various types, indexed by a shortcut tag. When a new application is installed in the mobile electronic device, the user can add shortcut information associated with the new application to the shortcut data store. The target information can define content associated with an application. When a shortcut to content is executed, the associated application is launched and begins operating on the content data. Further, the shortcuts can be created with different types of tags.

20 Claims, 8 Drawing Sheets

OTHER PUBLICATIONS

Ivens, Kathy, "Optimizing the Windows Registry" Feb. 1998.*
Anonymous, "Personalized Fast Access to Functions on a Mobile Telephone," *Research Disclosure, Kenneth Mason Publications*, Hampshire, GB, vol. 426, No. 33, (Oct. 1999), pp. 1-3.

Mohan, A. et al., "Voice Enabled Request and Response for Mobile Devices Supporting WAP Protocol," *Vehicular Technology Conference*, vol. 6, (Sep. 2000), pp. 2736-2743.

* cited by examiner

ALL SHORTCUTS
1 KIM AKERS            e
2 BOB HOHMAN           e
3 CHARLES FITZGERA     e3
4 BRIAN FLEMING        e
5 WELCOME TO MSN       url
6 YAHOO                url
7 SARAH AKHTAR         w
8 ADAM BARR            w
9 DAVID CAMPBELL       h
10 RICHARD CARLSON     w2

EDIT    ◇    MENU

*Fig.11*

NEW SHORTCUT
NAME:
KIM AKERS

VALUE:
(555) 555-5555         w

KEYPAD ASSIGNMENT:
6                      ◁▷
VOICE TAG:
NONE
                       ▷

DONE    ◇    MENU

*Fig.12*

SHORTCUT SYSTEM FOR USE IN A MOBILE ELECTRONIC DEVICE AND METHOD THEREOF

RELATED APPLICATIONS

This application claims the benefit under 35 U.S.C. §119 (e) of U.S. provisional patent Application No. 60/269,741, filed Feb. 16, 2001.

FIELD OF THE INVENTION

The present invention relates to mobile electronic devices and, more particularly, to shortcut systems for use in a mobile electronic device.

BACKGROUND OF THE INVENTION

Some types of mobile electronic devices are processor-controlled, with a user interface (UI) to allow the user to more easily and intuitively operate the device. For example, mobile telephones are increasingly becoming more than just wireless voice communication devices. Rather, in addition to handling voice data, mobile telephones have a display unit to display graphical data to support email, web browser, and other non-voice features.

Users can then use the various features of the mobile electronic device by launching applications and navigating through the application to perform a desired function. For example, a user wanting to check up on the latest price of a particular stock through the mobile electronic device can launch a web browser application on the mobile electronic device, search for a URL of a site that provides stock market quotes, enter in the name or code of the stock, and then request the quote. Similarly, a user wanting to send an email through the mobile electronic device can launch an email application, navigate to an address book/contacts list, select the desire email address in the address book/contacts list, and then start a new email message with the selected email address. Although this is a relatively straightforward system, users must perform several steps to perform the desired function.

SUMMARY OF THE INVENTION

In accordance with the present invention, a shortcut system is provided for use in a mobile electronic device having several types of shortcuts. In one aspect of the present invention, the shortcut system provides a mechanism in a mobile electronic device that allows a user to execute shortcuts of different types using a single mechanism. In one embodiment, the shortcut system includes a display, an operating system, a shortcut data store, and one or more applications, including a shortcut application used to create shortcuts and edit shortcut information contained in the shortcut data store. In this exemplary embodiment, the shortcut data store contains target information associated with applications of various types, indexed by a shortcut "tag". In contrast, existing systems generally can handle only one type of shortcut (e.g., one system for telephone number shortcuts, another system for URL shortcuts, and yet another for email shortcuts). When a new application is installed in the mobile electronic device, the user can easily add shortcut information associated with the new application to the shortcut data store. Thus, this aspect of the present invention advantageously allows a user to create, edit and execute shortcuts of multiple types using a single, unified, and extensible shortcut system.

In another aspect of the present invention, the user can create shortcuts in which the target information defines "content", unlike existing systems that generally only allow shortcuts that launch an application. As used in this context, the term "content" refers to particular data that an associated application will operate on. For example, the content may be a URL, email address, etc., each being associated with a corresponding application that "drills down" into the application using the content. Thus for example, in accordance with this aspect of the present invention, the user can create a shortcut directly to a contact entry that the user regularly views. When this shortcut is executed, the associated contact application is launched and begins operating to open that particular contact entry. In contrast, in existing systems, the user would launch the contacts application and then navigate through the contacts application in order to find the desired contact entry. Thus, this aspect of the present invention advantageously allows the user to reduce the number of steps to access desired information.

In still another aspect of the present invention, the shortcut system allows a user to create shortcuts with different types of tags, thereby advantageously increasing the flexibility of the shortcut system. For example, a tag may be a keystroke, a voice tag, a menu item selection, an icon or other link, etc. In a further refinement of this aspect, two or more tags of different types of tags may be associated with the same target information (i.e., the tags may be mapped to the same target).

In yet another aspect of the present invention, the shortcut system allows a user to execute a shortcut from a particular application, more than one application, or when no application is running, advantageously making the shortcut system more flexible. For example, most applications can be configured to allow a user to execute shortcuts having voice tags or menu item selection tags. In other embodiments, shortcuts having icon tags can be activated when no application is running or from a home screen. In still other embodiments, shortcuts having speed dial tags can be activated from the home screen or from a running dialer application.

In a further aspect of the present invention, shortcuts can be created using the shortcut application as previously described, or alternatively, from an application. In particular, an application can be configured to allow a user, while the application is running and presenting particular content, to create a shortcut associated with the application and the particular content being presented.

In a still further aspect of the present invention, the shortcut system is configured to support multi-digit speed dialing. In one embodiment, a user may enter digits sequentially using keystrokes of alphanumeric keys on the mobile electronic device. The user enters a single digit speed dial number by holding a keystroke for a predetermined duration. The digit defines a speed dial tag. The user enters a multi-digit speed dial number by entering the digits (from most significant digit to least significant digit) of the speed dial number by keystrokes. The user only holds the keystroke of the least significant digit for the predetermined duration, the previous digits being buffered as the user enters them. This aspect advantageously allows a user to store a larger number of speed dial shortcuts without interfering with the normal operation of typical dialer applications (such dialer application commonly buffer the digits as they are entered so that the user so that can enter a complete telephone number).

BRIEF DESCRIPTION OF THE DRAWINGS

FIG. 11 is a diagram illustrating an exemplary screen of a shortcut UI used in accessing a shortcut, according to one embodiment of the present invention.

FIG. 12 is a diagram illustrating an exemplary screen of a shortcut UI used in creating a shortcut, according to one embodiment of the present invention.

DETAILED DESCRIPTION OF THE PREFERRED EMBODIMENT

Illustrative Mobile Electronic Device

Figure 1:
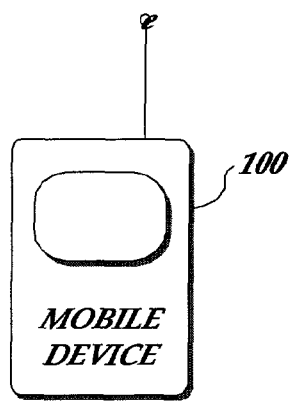
FIG. 1 is a diagram illustrating a perspective view of an exemplary mobile electronic device.

FIG. 1 illustrates a mobile electronic device 100, which in this example is a mobile telephone (e.g., a "cell phone"). Other examples of a mobile electronic device include personal digital assistants (PDAs), notebook computers, etc. that include a processor or controller that operate under software or firmware control. Such mobile electronic devices may include a number of different functions (e.g., a wireless web browser function, a wireless telephone function, a wireless email function, etc.).

Users of such mobile electronic devices will often perform the same task over and over again. For example, the user may want to know the current price of a particular stock several times per day. Thus, the user may want a simple and quick way to check the price of this particular stock without having to perform the several steps needed to launch web browser and navigate through the website each time the user wants to check the stock price. It is believed that there is no currently existing system for use in a device such as the mobile electronic device 100 that allows a user to have a shortcut to a website or, more particularly, to specific content provided by a web service provider.

Similarly, the user may regularly send email to a particular email address. The user may want a simple and quick way to launch an email application and compose a new email message to this particular email address. It is believed that there is no currently existing system for use in a device such as the mobile electronic device 100 that allows the user to have a shortcut to compose a new email message to a preselected email address. Still further, it is believed that there is no currently existing shortcut system for use in a device such as the mobile electronic device 100 that allows a user to access different types of shortcuts from a single application or state.

Illustrative Hardware Implementation

Figure 2:
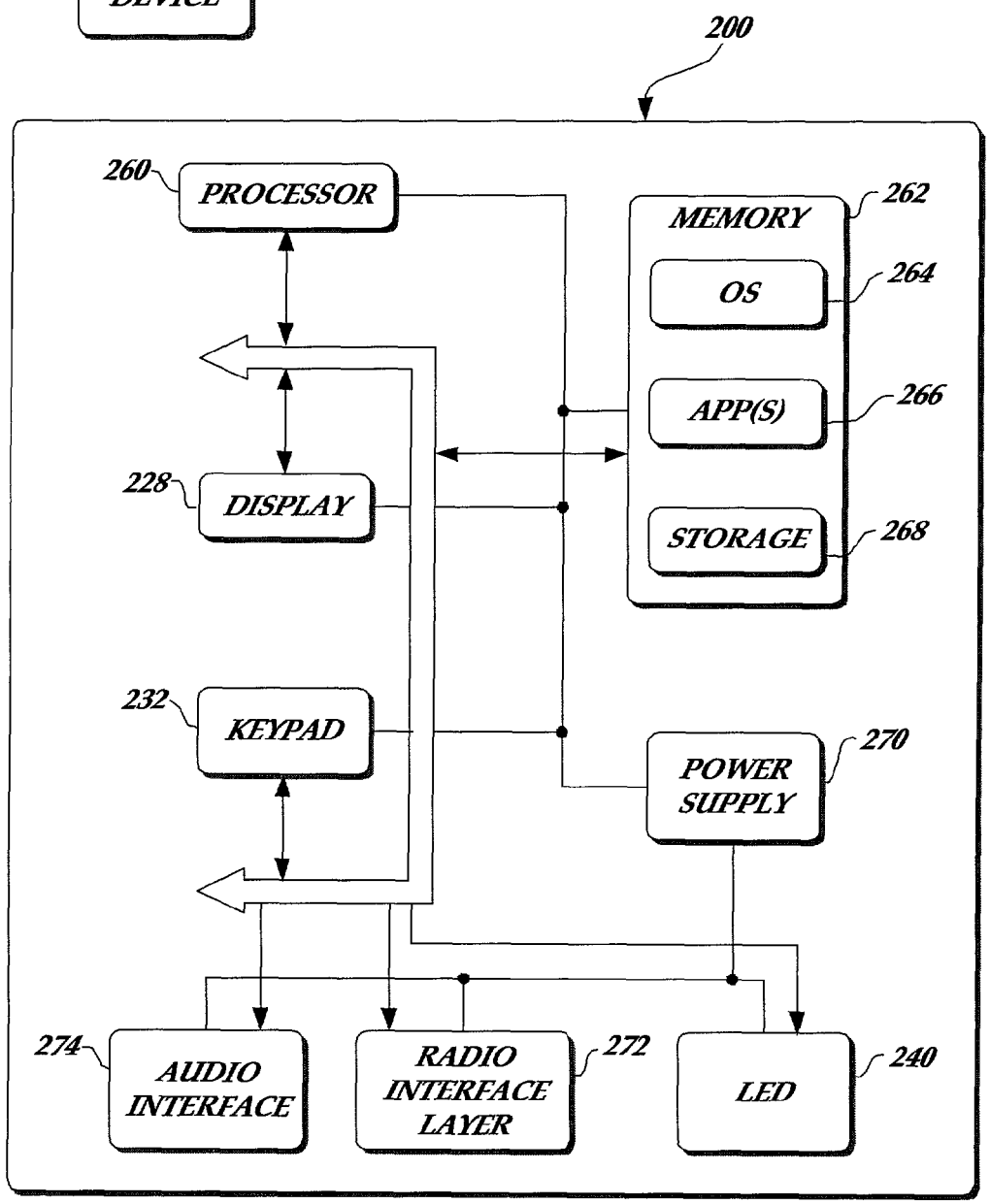
FIG. 2 is a block diagram illustrating components of an exemplary mobile electronic device, according to one embodiment of the present invention.

FIG. 2 is a functional block diagram illustrating functional components of a mobile electronic device 200. The mobile electronic device 200 has a processor 260, a memory 262, a display 228, and a keypad 232. The memory 262 generally includes both volatile memory (e.g., RAM) and non-volatile memory (e.g., ROM, Flash Memory, or the like). The mobile electronic device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile electronic devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile electronic device 200 also includes non-volatile storage 268 within the memory 262. The non-volatile storage 268 may be used to store persistent information which should not be lost if the mobile electronic device 200 is powered down. The applications 266 may use and store information in the storage 268, such as e-mail or other messages used by an e-mail application, contact information used by a PIM, appointment information used by a scheduling program, documents used by a word processing application, and the like.

The mobile electronic device 200 has a power supply 270, which may be implemented as one or more batteries. The power supply 270 might further include an external power source, such as an AC adapter or a powered docking cradle that supplements or recharges the batteries.

The mobile electronic device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile electronic device 200 also includes a radio interface layer 272 that performs the function of transmitting and receiving radio frequency communications. The radio interface layer 272 facilitates wireless connectivity between the mobile electronic device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Illustrative Unified Shortcut System

Figure 3:
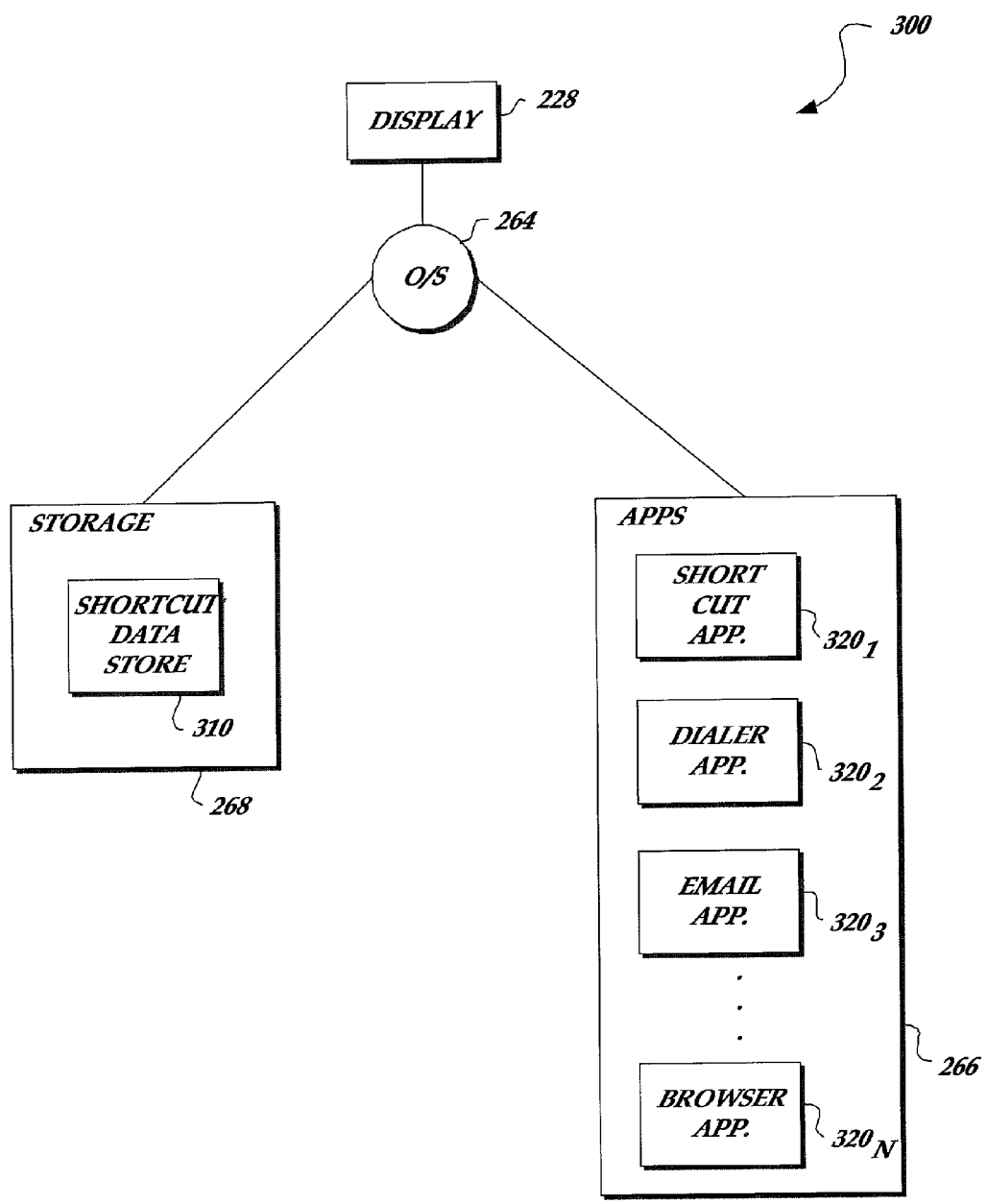
FIG. 3 is a block diagram illustrating components of a unified shortcut system, according to one embodiment of the present invention.

FIG. 3 is a block diagram illustrating components of a shortcut system 300, according to one embodiment of the present invention. The shortcut system 300 includes the display 228, the operating system 264, the applications 266, and the storage 268. Further, in this exemplary embodiment, the storage 268 includes a shortcut data store 310 that stores persistent shortcut information. Still further, the applications 266 include a shortcut application $320_1$, a dialer application $320_2$, an email application $320_3$ and a browser application $320_N$, along with other applications (not shown). In other embodiments, the applications 266 may include fewer, more, or a different combination of the applications $320_1$-$320_N$.

In one embodiment, the shortcut data store 310 includes re-writable non-volatile memory for storing shortcut information provided by the user. Using the shortcut application $320_1$, the user can create or edit shortcuts by entering or changing shortcut information stored in the shortcut data store 310. The shortcut application $320_1$ includes a shortcut UI that allows a user to easily view, edit and create shortcuts. The shortcut UI is described in more detail below in conjunction with FIGS. 11 and 12.

In this exemplary embodiment, the shortcut data store 310 contains target information associated with applications of various types, indexed by a shortcut "tag". That is, the shortcut data store 310 serves as a look-up table that is accessed when a shortcut operation is performed. The shortcut tags and the target data can be of different types (e.g., associated with different kinds of applications). In contrast, existing systems generally can handle only one type of shortcut (e.g., one system for telephone number shortcuts, another system for URL shortcuts, and yet another for email shortcuts).

The shortcut system 300 is extensible in that the shortcut data store 310 has a simple yet flexible architecture (described in more detail below in conjunction with FIGS. 9 and 10). For example, if a new application is installed in the mobile electronic device 100 (FIG. 1), the user can easily add shortcut information associated with the new application to the shortcut data store 310 without the need to modify shortcut information already stored in the shortcut data store 310 and without the need to modify existing applications.

Illustrative Shortcut System States

Figure 4:
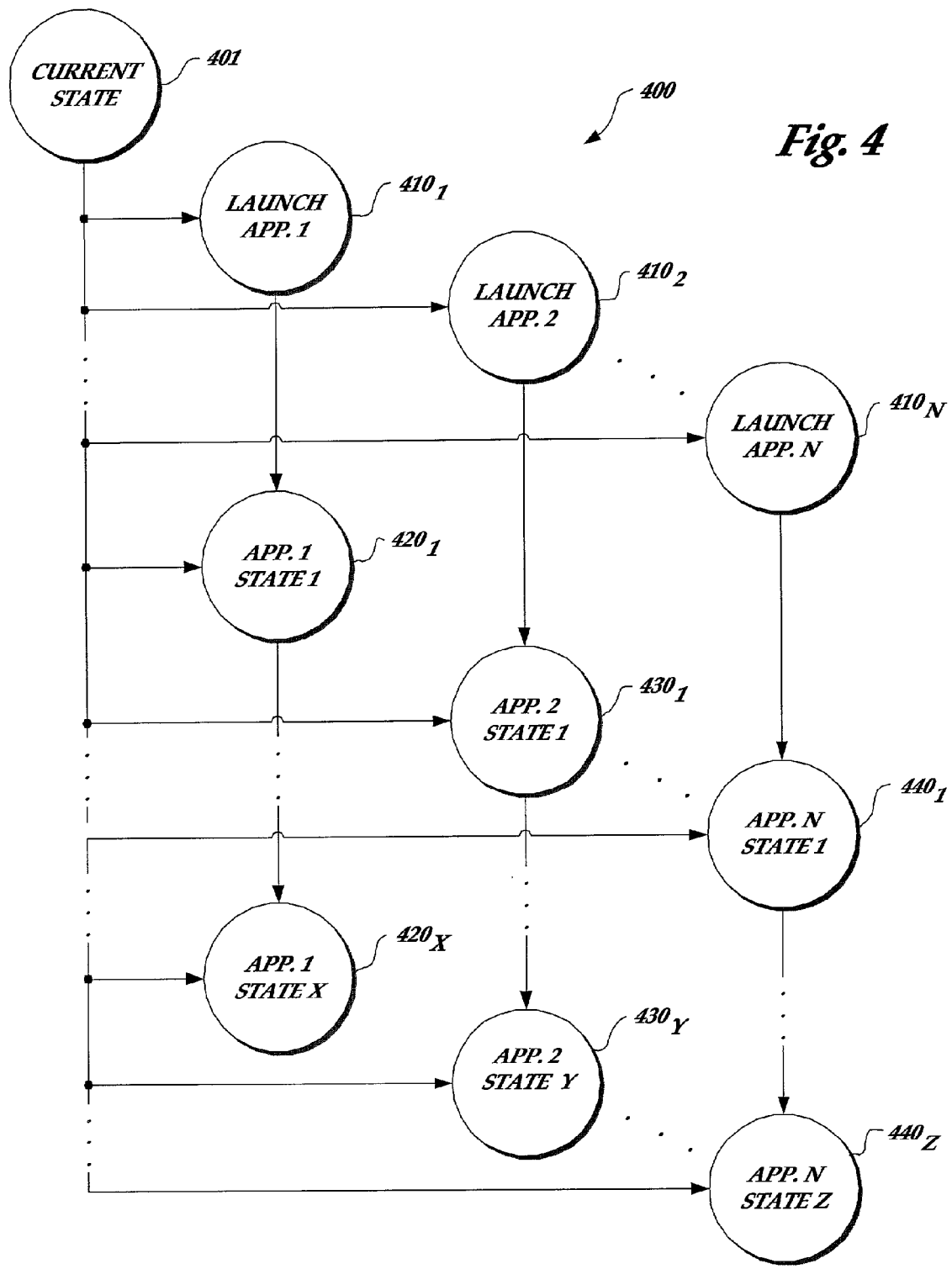
FIG. 4 is a state diagram illustrating the operation of a shortcut system, according to one embodiment of the present invention.

FIG. 4 is a generalized state diagram illustrating the operation of a shortcut system (e.g., the shortcut system 300 of FIG. 3) in executing a shortcut. For purposes of this description, the mobile electronic device 100 (FIG. 1) is in a current state 401. The current state 401 can be any of several possible states. For example, the current state 401 of the mobile electronic device 100 may be the state of displaying a "home screen" or "desktop" on the display unit 228 (FIG. 3) while one or more or even none of the applications 266 are running. The current state 401 of the mobile electronic device 100 may also be the state of running an application (e.g., the dialer application $320_2$). In the current state 401, the mobile electronic device 100 is able to receive input from a user, such as through the keypad 232 or the audio interface 274 (FIG. 2).

From the current state 401, in accordance with the present invention, the user may execute a shortcut to an application or directly to content. For example, from the current state 401, the user may execute a shortcut to launch an application 1, an application 2, . . . , or an application N, thereby entering into a state $410_1$, a state $410_2$, . . . or a state $410_N$, respectively. Alternatively, from the current state 401, the user may execute a shortcut directly to content. That is, a shortcut may be mapped directly to a predetermined state in a particular application. For example, from the current state 401, the user can execute a shortcut that results in launching application 1 and placing the mobile electronic device 100 directly into one of states $420_1$, . . . , or $420_X$ of application 1. In contrast, in a conventional system, the user would have to navigate through application 1 to reach one of these states. In more concrete terms, the application 1 may be a web browser, with the states $420_1$, . . . $420_X$ being the states of running the browser to view various pages of a preselected website or to retrieve specific content (e.g., stock quotes). Similarly, the user can execute shortcuts to other content, such as states $430_1$, . . . $430_Y$ of application 2, and so on, to states $440_1$, . . . $440_Z$ of application N.

In a very general case, a user can launch shortcuts associated with applications 1 through N from any current state 401. However, depending on the application associated with the current state 401, the shortcuts that can be executed from the current state 401 can be limited with regard to the type of the shortcut tag or the shortcut target's associated application. For example, in one embodiment, the user can execute shortcuts from essentially any current state 401 by executing a shortcut that is activated using a voice tag. That is, voice tags are not limited by the application associated with the current state 401. In another embodiment, when the current state 401 is associated with the shortcut application $320_1$ (FIG. 3), the user can run and execute any of the user's shortcuts. In other embodiments, a user may be able to execute certain types of shortcuts only when the current state 401 is associated with certain applications. For example, in one embodiment, the user may only execute shortcuts to dialer application content from a dialer application state or from a home screen state.

Illustrative Shortcut Execution Method

Figure 5:
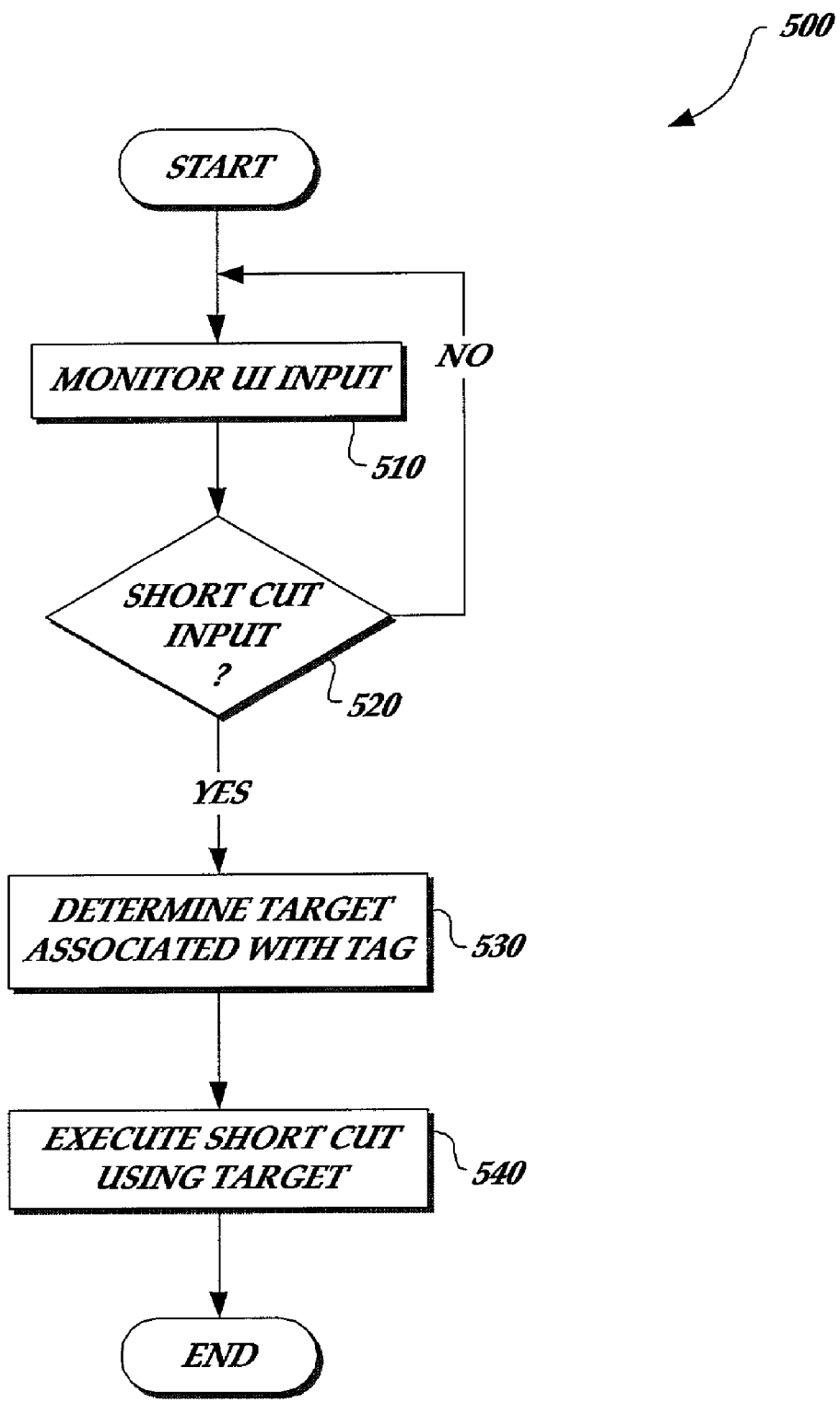
FIG. 5 is a flow diagram illustrating the operation of a shortcut system, according to one embodiment of the present invention.

FIG. 5 is a flow diagram illustrating a method 500 that can be used to operate a shortcut system (e.g., the shortcut system 300 of FIG. 3), according to one embodiment of the present invention. With the shortcut system 300 (FIG. 3) in the current state 401, the method 500 begins at block 510 in which the user's inputs to the mobile electronic device 100 (FIG. 1) are monitored. For example, in one embodiment, the operating system 264 monitors the user's inputs into the mobile electronic device 100. That is, the operating system 264 can be configured to pass the user's inputs (e.g., keystrokes, voice inputs, cursor inputs) to appropriate input handling objects, which are in effect monitoring and processing the user's inputs.

At a decision block 520, user input has been detected, and the method 500 determines whether the user's input is shortcut input. As previously described, a user can begin executing a shortcut by providing a voice tag (e.g., audibly reciting a pre-configured vocal command), entering a speed dial number, making a menu item selection, clicking an icon or other link, and the like. In one embodiment, this operation is performed by the operating system 264, which, by passing the user's inputs to the appropriate object, can determine if a user's input is a shortcut input. For example, the operating system 264 may pass voice inputs to a voice recognition object that determines whether the voice input is a voice tag associated with a shortcut. Similarly, the operating system 264 may pass keystroke inputs to a user interface routine that determines whether the keystroke input is a speed dial input associated with a shortcut. If the user's input is not a shortcut input, the method 500 returns to the block 510 to continue to monitor the user's inputs.

If the user's input is a shortcut input, the method 500 proceeds to a block 530. In the block 530, the method 500 determines the shortcut target associated with the shortcut. The shortcut input includes data hereafter referred to as a "tag" that identifies information to be retrieved from the shortcut data store 310 (FIG. 3). In one embodiment, the method 500 uses the tag provided in the shortcut input to access the shortcut data store 310. The shortcut data store 310 essentially includes a lookup table that associates tags with target applications or content or both. For example, if the shortcut input contains a voice tag, in one embodiment, the operating system 264 receives the voice tag (from the voice recognition object as described above), and uses that tag to access the shortcut data store 310 and retrieve target information associated with the tag. As previously described, the shortcut target may be an application or content, such as, for example, an email address, a URL, a contact card, a telephone number, and the like.

At a block 540, the method 500 completes the execution of the shortcut by invoking the application associated with the shortcut target. If the shortcut target is associated with content, the method 500 also causes the target application to operate on data contained in the shortcut target, such as by including a pointer or parameter identifying the content with an instruction to act on the content. For example, if the content is a URL, the method will launch the browser application and cause the browser to open the site addressed by the URL. More particularly, a "quotes tag" may be associated, in the shortcut data store 310, with an application (e.g., browser software) and a listing of stock quotes of interest. Triggering the corresponding shortcut would cause the target application (the browser software) to be invoked with instructions to retrieve the stock quotes of interest and display them. After completing execution of the shortcut, the method 500 ends.

Illustrative Shortcut Method

Figure 6:
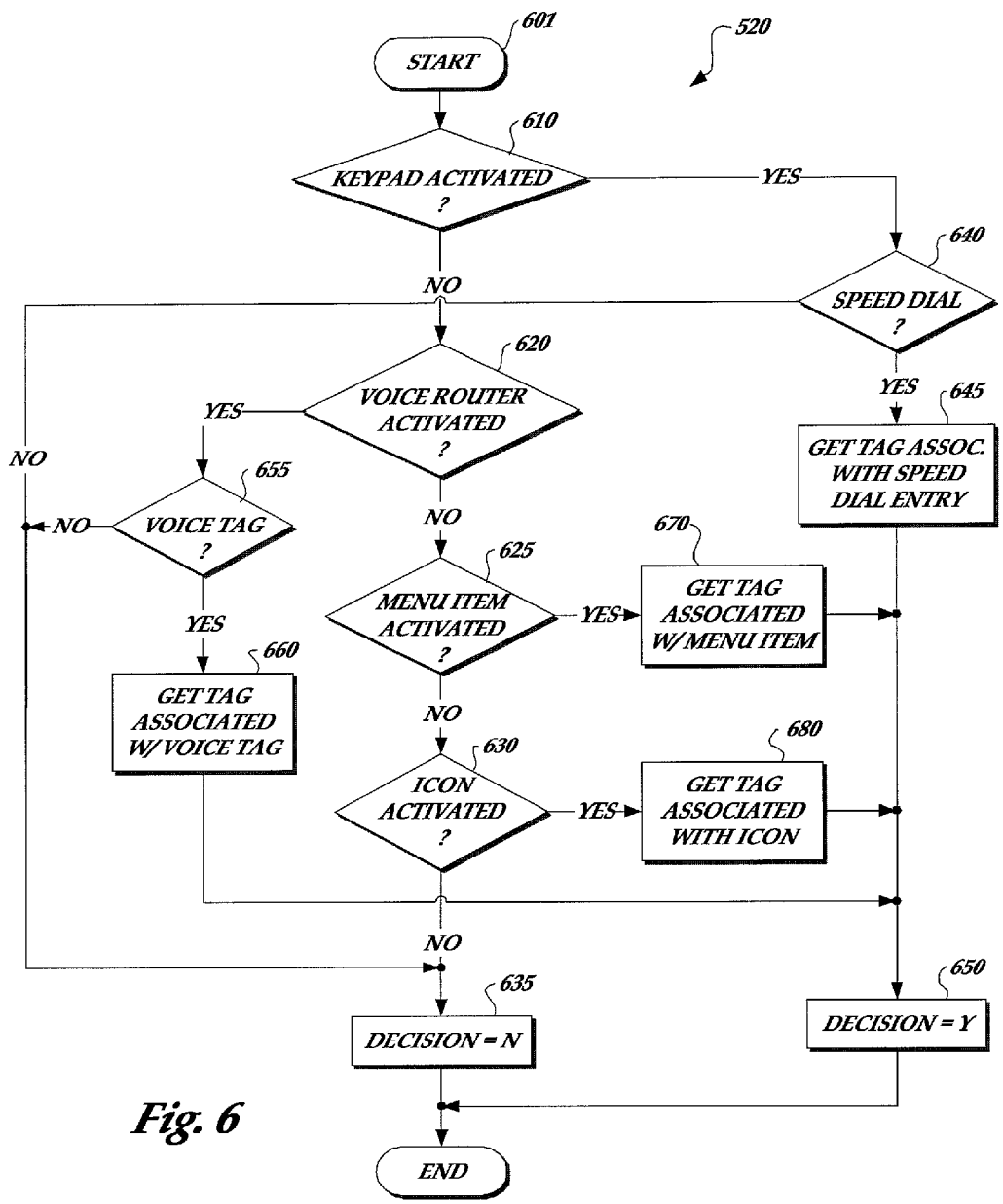
FIG. 6 is a flow diagram illustrating a shortcut detection operation, according to one embodiment of the present invention.

FIG. 6 is a flow diagram illustrating an exemplary method of operation of the block 520 (FIG. 5) for determining whether user input is actually shortcut input, according to one embodiment of the present invention. Although described here as a structural flow of instructions, it will be appreciated by those skilled in the art that several of the determinations may be replaced by an event-driven system wherein receiving input from various sources may trigger different events, with each event having a special-purpose handler registered to handle that event, thereby obviating the need to determine the source of the input.

This embodiment of the block 520 enters at starting block 601 where user input of some form has been detected and passed to the shortcut application $320_1$. Processing begins at decision block 610 where a determination is made whether a keypad has been activated. In one embodiment, the operating system 264 is configured to detect keystrokes and pass the keystroke to a user interface currently responsible for resolving keypad input, such as a keystroke object (which may be part of the shortcut application $320_1$).

If the input is keypad input, then in decision block 640, the keystroke object determines whether the keystroke is a speed dial input. One embodiment of this operation is described further below in conjunction with FIG. 7. In this embodiment, if the keystroke is not a speed dial input, the method of the block 520 jumps to a block 635 in which the decision of the block 520 is set to "NO", thereby indicating that the user's input is not shortcut input, and then the method of the block 520 returns. On the other hand, if the keystroke is indeed a speed dial input, a block 645 is performed. In one embodiment of the block 645, the keystroke object retrieves from the speed dial input and returns the tag corresponding to the keystroke to the operating system 264. A block 650 is then performed in which the decision of the block 520 is set to "YES", thereby indicating that the user's input is a shortcut input and the method of the block 520 returns.

If in the decision block 610 a keypad is not activated, the method of the block 520 proceeds to a decision block 620 in which the method of block 520 determines whether the voice recognition object is activated. In one embodiment, the operating system 264 is configured to detect when a user activates a voice input key. The voice input key may be a "RECORD" key available on some mobile electronic devices that have a voice message-recording feature. By activating the voice input key, the user activates the audio interface 274 (FIG. 2) to allow the voice input to be recorded.

In a decision block 655, the method of the block 520 determines whether the voice input is a voice tag input. One embodiment of this operation is described further below in conjunction with FIG. 8. In this embodiment, if the voice input is not a voice tag input, the method of the block 520 jumps to the block 635. As described above, the block 635 indicates that the user's input is not a shortcut input. However, if the voice input is a voice tag input, in a block 660 the voice router object returns the tag corresponding to the voice tag to the shortcut application $320_1$. Then the block 650 is performed as previously described whereby the block 520 indicates that the user's input was a shortcut input and the method of the block 520 ends.

If in the decision block 620 the voice router object is not activated, the method of the block 520 proceeds to a decision block 625 in which the method of block 520 determines whether the user's input was to activate a shortcut menu item. In one embodiment, the operating system 264 is configured to detect when a user has opened a menu and selected a shortcut menu item. If the user has selected a shortcut menu item, a block 670 is performed in which the method of the block 520 returns the shortcut tag corresponding to the shortcut menu item selection to the operating system 264. Then the block 650 is performed as previously described whereby the block 520 indicates that the user's input was a shortcut input and the method of the block 520 ends.

If in the decision block 625 the user's input was not a shortcut menu item selection, the method of the block 520 proceeds to a decision block 630 in which the method of block 520 determines whether the user's input was to activate a shortcut icon. For example, the user's input may be to click on a shortcut icon displayed on the home screen. In one embodiment, the operating system 264 is configured to detect when a user has selected a shortcut icon. If the user has selected a shortcut menu item, a block 680 is performed in which the method of the block 264 returns the shortcut tag corresponding to the shortcut icon to the operating system 264. Then the block 650 is performed as previously described whereby the block 520 indicates that the user's input was a shortcut input and the method of the block 520 ends. However, if the user's input was not a shortcut icon activation, then the block 635 is performed as previously described and the method of the block 520 ends.

Although this embodiment of the method of the block 520 is described with the decision blocks 610, 620, 625 and 630 being performed in the given order, in other embodiments, the order of these decision blocks may be changed so long as the YES branches of each decision block remains interconnected between the blocks as in FIG. 6. In addition, as mentioned above, the determinations made at decision blocks 610, 620, 625 and 630 (as well as others) may be replaced by an event driven system wherein receiving input over different sources causes the operating system 264 to pass the input to different special-purpose handlers. In such a system, passing input to a particular special-purpose handler serves the same purpose as testing the input at each decision block 610, 620, 625 and 630.

Figure 7:
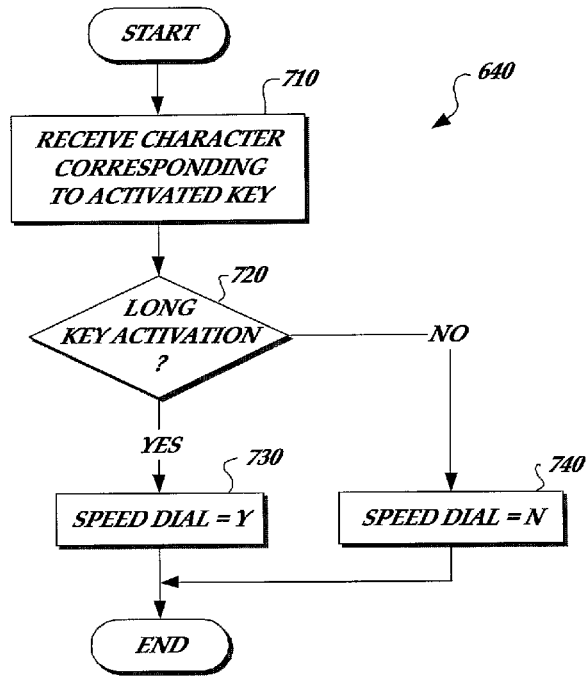
FIG. 7 is a flow diagram illustrating a speed dial detection operation, according to one embodiment of the present invention.

FIG. 7 is a flow diagram illustrating an exemplary method of operation for the block 640 (FIG. 6), according to one embodiment of the present invention. This embodiment of the block 640 begins with a block 710 in which the method of the block 640 receives data corresponding to the keystroke. In one embodiment, the keystroke object receives the keystroke data from the operating system 264. Moreover, the keystroke object may be a special-purpose handler registered to receive input from the keypad 232.

In a decision block 720, the method of the block 640 determines whether the keystroke is a speed dial keystroke. For example, a speed dial keystroke can be one in which a user depresses and holds down a keystroke. In one embodiment, the keystroke object is configured to determine whether the keystroke is held longer than a predetermined time period, thereby indicating that the keystroke is a speed dial keystroke. If the keystroke is a speed dial keystroke, in a block 730 the decision of the block 640 is set to YES and the method of the block 640 ends. Conversely, if the keystroke is not a speed dial keystroke, in a block 740 the decision of the block 640 is set to NO and the method of block 640 ends.

Figure 8:
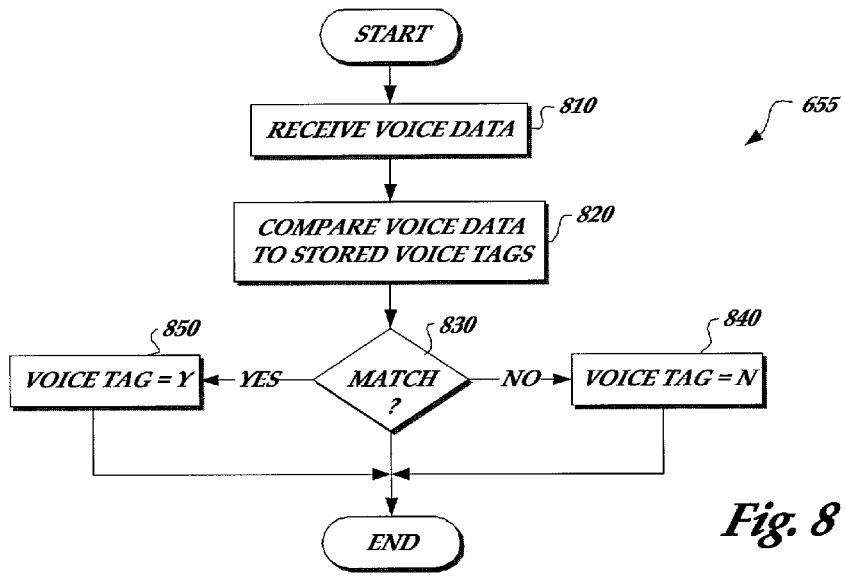
FIG. 8 is a flow diagram illustrating a voice tag detection operation, according to one embodiment of the present invention.

FIG. 8 is a flow diagram illustrating an exemplary method of operation for the block 655 (FIG. 6), according to one embodiment of the present invention. This embodiment of the block 655 begins with a block 810 in which the method of the block 655 receives voice data corresponding to the user's voice input. In one embodiment, the voice router object receives the voice data from the operating system 264. Again, the voice router object may be a special-purpose handler registered to receive input from the audio interface 274.

In a block 820, the method of the block 655 compares the voice data to stored voice tags corresponding to shortcuts. In one embodiment, this comparison is performed using voice recognition components or modules incorporated into or operated by the voice router object.

In a decision block 830, if the voice data does not match a stored voice tag, in a block 840, the decision of the block 655 is set to NO and the method of the block 655 ends. On the other hand, if the voice data does match a stored voice tag, in a block 850 the decision of the block 655 is set to YES and the method of the block 655 ends.

Illustrative Shortcut Data Store Organization

Figure 9:
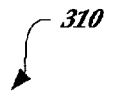
FIG. 9 is a diagram illustrating the organization of a shortcut data store, according to one embodiment of the present invention.

FIG. 9 is a diagram illustrating an exemplary organization of the shortcut data store 310, according to one embodiment of the present invention. In this exemplary embodiment, the shortcut data store 310 is implemented as a look-up table, with shortcut targets being indexed by the shortcut tags. As previously described, the shortcut targets can be applications or content associated with an application and, further, the tags and targets can be of various types. For example, the shortcut tags can be, for example, icons, speed dial numbers, voice tags, and menu item selections. The targets can be, for example, URLs, telephone numbers, email addresses and contact cards. Still further, different tags (e.g., shortcut tags 3 and 4) can be mapped to the same target or be mapped to the same target. As shown in this embodiment of shortcut data store 310, the tags can be of different types (e.g., icons, speed dial numbers, voice tags, menu item selections, etc.).

Figure 10:
FIG. 10 is a diagram illustrating the organization of a shortcut data store, according to another embodiment of the present invention.

FIG. 10 is a diagram illustrating another exemplary organization of the shortcut data store 310 (FIG. 3). This embodiment is similar to the embodiment of FIG. 9, with the addition of "name" and "type" fields. In this embodiment, when creating the shortcut, the user can enter in a name for the shortcut as a string, which can then be displayed so that a user can view the shortcuts. For example, the user can run the shortcut application $320_1$ to view, create or edit shortcuts. The user can also enter the type of the shortcut target (e.g., URL, work telephone number, home telephone number, email address, etc.).

Illustrative Shortcut UI

FIG. 11 is a diagram illustrating an exemplary screen of a shortcut UI used in viewing and executing shortcuts, according to one embodiment of the present invention. Such a screen can be displayed when running the shortcut application $320_1$. In one embodiment, the shortcut UI is configured to allow a user to sort the viewed shortcut entries by name, type, entry number, etc. In addition, the shortcut UI is configured to allow a user to select and execute a shortcut directly from this screen. This UI is also configured to allow a user to select and edit a shortcut entry directly from this screen. For example, to edit a shortcut entry, the user can select a shortcut entry and an edit menu item to be taken to a card view screen of the entry that can be used in creating and editing shortcuts. One embodiment of this card view screen is described below in conjunction with FIG. 12.

FIG. 12 is a diagram illustrating an exemplary screen of a shortcut UI used in creating and editing a shortcut, according to one embodiment of the present invention. In other embodiments, the screen may appear differently, provided it displays information such as shown in the shortcut data store of FIG. 10. In this embodiment, the shortcut UI provides this screen to the user when the user chooses an "edit shortcut" or "create shortcut" menu item while running the shortcut application $320_1$ (FIG. 3). In a further refinement, applications can be configured to have a menu item that the user can choose to launch a shortcut object by which the user can create a shortcut. Thus, the screen of FIG. 12 can also be used when the user creates or edits a shortcut while running some other application (e.g., email, browser, dialer, etc.). In one embodiment, the user can enter the name of the shortcut through the shortcut UI. In other embodiments, when the screen is provided when running an application, the shortcut name and other data (e.g., email address, telephone number, URL, etc.) can be automatically added by the application when the screen is displayed. The shortcut tag can be a keypad assignment (such as in a speed dial) or a voice tag (which can be displayed in this screen as an icon). In a further refinement, the shortcut can have both a keypad tag and a voice tag.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for providing shortcuts in a mobile telephone, the method comprising:

providing an application neutral shortcut application, wherein the application neutral shortcut application is independently accessible from a plurality of user application statuses from a plurality of user applications of the mobile telephone, wherein the application neutral shortcut application includes a user interface that is independently accessible from the plurality of user application statuses from a plurality of user applications of the mobile telephone, wherein the user interface includes a list of editable shortcuts associated with the user applications of the mobile telephone, wherein the user interface includes a shortcut tag type indication associated with each of the editable shortcuts that indicates the type of shortcut tag for accessing a target of one of the applications of the mobile telephone;

linking the application neutral shortcut application to a collective application neutral shortcut data store that maintains shortcut data for a plurality of application types, wherein the shortcut data store includes a lookup table that links a plurality of different shortcut tag types to different types of targets, wherein the targets comprise application targets and content targets, wherein the shortcut tag types include a speed dial shortcut tag, a voice shortcut tag, a menu item shortcut tag and an icon shortcut tag;

monitoring user inputs to the mobile telephone from the application neutral shortcut application, wherein monitoring user input includes monitoring speed dial selection inputs, voice tag inputs, menu item selection inputs and icon selection inputs;

determining whether the user input is a shortcut input, wherein the shortcut input comprises a shortcut tag associated with a application neutral shortcut application, and further wherein the shortcut tag corresponds to a shortcut target in the lookup table of the collective application neutral shortcut data store;

locating the shortcut target in the lookup table based on the shortcut tag when the user input is a shortcut input;

executing the application of the mobile telephone associated with the target when the located shortcut target is an application; and executing the application of the mobile telephone associated with the target and automatically opening the content data when the shortcut target is a content target.

2. The method of claim 1, wherein the types of targets include at least one selected from a group comprising: telephone numbers, email addresses, uniform resource locators (URLs), and contact cards.

3. The method of claim 1, wherein the shortcut input comprises more than one type.

4. The method of claim 3, wherein the types of shortcut input include at least one selected from a group comprising: a speed dial input, a voice input, a menu item selection input, and an icon selection input.

5. A computer-readable storage medium having computer-executable instructions for performing steps comprising:

providing an application neutral shortcut application, wherein the application neutral shortcut application is independently accessible from a plurality of user application statuses from a plurality of user applications of the mobile telephone, wherein the application neutral shortcut application includes a user interface that is independently accessible from the plurality of user application statuses from a plurality of user applications of the mobile telephone, wherein the user interface includes a list of editable shortcuts associated with the user applications of the mobile telephone, wherein the user interface includes a shortcut tag type indication associated with each of the editable shortcuts that indicates the type of shortcut tag for accessing a target of one of the applications of the mobile telephone;

linking the application neutral shortcut application to a collective application neutral shortcut data store that maintains shortcut data for a plurality of application types, wherein the shortcut data store includes a lookup table that links a plurality of different shortcut tag types to different types of targets, wherein the targets comprise application targets and content targets, wherein the shortcut tag types include a speed dial shortcut tag, a voice shortcut tag, a menu item shortcut tag and an icon shortcut tag;

monitoring user inputs to the mobile telephone from the application neutral shortcut application, wherein monitoring user input includes monitoring speed dial selection inputs, voice tag inputs, menu item selection inputs and icon selection inputs;

determining whether the user input is a shortcut input, wherein the shortcut input comprises a shortcut tag associated with a application neutral shortcut application, and further wherein the shortcut tag corresponds to a shortcut target in the lookup table of the collective application neutral shortcut data store;

locating the shortcut target in the lookup table based on the shortcut tag when the user input is a shortcut input;

executing the application of the mobile telephone associated with the target when the located shortcut target is an application; and executing the application of the mobile telephone associated with the target and automatically opening the content data when the shortcut target is a content target.

6. The computer-readable medium of claim 5, wherein the types of targets include at least one selected from a group comprising: telephone numbers, email addresses, URLs, and contact cards.

7. The computer-readable storage medium of claim 5, wherein the shortcut input comprises more than one type.

8. The computer-readable storage medium of claim 7, wherein the types of shortcut input include at least one selected from a group comprising: a speed dial input, a voice input, a menu item selection input, and an icon selection input.

9. A handheld mobile telephone device, comprising:

a processor; and a memory having computer-executable instructions stored thereon, wherein the computer executable instructions are configured for:

providing an application neutral shortcut application, wherein the application neutral shortcut application is independently accessible from a plurality of user application statuses from a plurality of user applications of the mobile telephone device, wherein the application neutral shortcut application includes a user interface that is independently accessible from the plurality of user application statuses from a plurality of user applications of the mobile device, wherein the user interface includes a list of editable shortcuts associated with the user applications of the mobile device, wherein the user interface includes a shortcut tag type indication associated with each of the editable shortcuts that indicates the type of shortcut tag for accessing a target of one of the applications of the mobile device;

providing shortcuts to a plurality of targets in a lookup table of the application neutral shortcut data store that maintains shortcut data for a plurality of application types, wherein the lookup table includes a plurality of shortcut tag types associated with different types of targets, and further wherein the targets comprise application targets and content targets, wherein the shortcut tag types include a speed dial shortcut tag, a voice shortcut tag, a menu item shortcut tag and an icon shortcut tag;

monitoring user input to the mobile telephone device from the application neutral shortcut application, wherein monitoring user input includes monitoring speed dial selection inputs, voice tag inputs, menu item selection inputs and icon selection inputs;

determining whether the user input is a shortcut input, wherein the shortcut input comprises a shortcut tag, and further wherein the shortcut tag corresponds to a shortcut target in the lookup table;

locating the shortcut target in the lookup table based on the shortcut tag; and executing the application of the mobile telephone device associated with the target, wherein the content is accessed when the located shortcut target is a content target.

10. The handheld mobile telephone device of claim 9, wherein the types of targets include at least one selected from a group comprising: telephone numbers, email addresses, URLs, and contact cards.

11. The handheld mobile telephone device of claim 9, wherein the shortcut input comprises more than one type.

12. The handheld mobile telephone device of claim 11, wherein the types of shortcut input include at least one selected from a group comprising: a speed dial input, a voice input, a menu item selection input, and an icon selection input.

13. The handheld mobile telephone device of claim 9, wherein the speed dial shortcut tag includes a digital sequence of keys.

14. The handheld mobile telephone device of claim 9, wherein the speed dial shortcut tag includes a key activation for a predetermined duration.

15. The method of claim 1, wherein the speed dial shortcut tag includes a digital sequence of keys.

16. The method of claim 1, wherein the speed dial shortcut tag includes a key activation for a predetermined duration.

17. The method of claim 1, wherein the lookup table is indexed by shortcut tag type.

18. The computer-readable storage medium of claim 5, wherein the speed dial shortcut tag includes a digital sequence of keys.

19. The computer-readable storage medium of claim 5, wherein the speed dial shortcut tag includes a key activation for a predetermined duration.

20. The computer-readable storage medium of claim 5, wherein the lookup table is indexed by shortcut tag type.

* * * * *